(12) United States Patent
Chen

(10) Patent No.: US 7,434,860 B2
(45) Date of Patent: Oct. 14, 2008

(54) LOOSE POSITIONING SEAT

(76) Inventor: Mike Chen, 2F, No. 176, Jian 1st Rd., Jhonghe City, Taipei County 235 (TW)

( * ) Notice: Subject to any disclaimer, the term of this patent is extended or adjusted under 35 U.S.C. 154(b) by 329 days.

(21) Appl. No.: 11/432,634

(22) Filed: May 12, 2006

(65) Prior Publication Data

US 2007/0262600 A1  Nov. 15, 2007

(51) Int. Cl.
*B60R 27/00* (2006.01)

(52) U.S. Cl. .................. 296/37.8; 296/37.12; 455/344; 455/345; 455/346

(58) Field of Classification Search ............... 296/37.8, 296/37.12; 455/344, 345, 346
See application file for complete search history.

(56) References Cited

U.S. PATENT DOCUMENTS 6,778,813 B1 *  8/2004  Lilly ......................... 455/344

* cited by examiner

*Primary Examiner*—Lori L Lyjak
(74) *Attorney, Agent, or Firm*—Troxell Law Office, PLLC

(57) ABSTRACT

A mobile stabilizing seat is composed of a seat body, a driving stabilizing set, and a cover. The seat body is provided with a block partitioned into containing slots at a periphery of the block, and a periphery of the seat body is formed with a plurality of opening slots. The driving stabilizing set is mobile assembled with a gear on the seat body, and the gear is gnawed with a plurality of stabilizing members below each of which is provided with a pillar. Each pillar is sheathed with an elastic member which is one end transfixed into the containing slot partitioned at the periphery of block, for enabling each stabilizing member to be mobile stabilized. The cover is assembled on the seat body. Accordingly, the mobile stabilizing seat proves a design of perfect driving and robust stabilizing, which is easily and quickly assembled, firmly stabilized, and used conveniently.

4 Claims, 5 Drawing Sheets

US 7,434,860 B2

LOOSE POSITIONING SEAT

BACKGROUND OF THE INVENTION (a) Field of the Invention

The present invention relates to a loose positioning seat, and more particular to a loose positioning seat which is formed into a perfect driving and a robust positioning by a design which assembles a seat body, a driving positioning set, and a cover, so as to enable a machinery (or other device to be used) to be assembled with the loose positioning seat, such that all kinds of machineries can be quickly and firmly positioned by the loose positioning seat, thereby being provided with effects of easy to assemble and convenient to carry and utilize, and being suitable to be assembled with all kinds of cup racks in a vehicle or with similar structures in other locations.

(b) Description of the Prior Art

A conventional multimedia device or other electronic device used in a vehicle is primarily composed of a transformation seat and a power cord, wherein the transformation seat can provide for a connection to a digital music walkman (iPod) and the power cord is connected to a junction of cigarette-lighter, so as to provide a power source to the digital music walkman (iPod) or other electronic equipment through the transformation seat. Although the multimedia device is provided with an effect of supplying the power source to the digital music walkman (iPod) or other electronic equipment, the transformation seat does not have a positioning design; therefore, it will be usually fallen off due to a vibration of vehicle, upon using the multimedia device. Accordingly, in order to firmly position the transformation seat, a user will usually use a twin adhesive or a glue to directly fix the transformation seat. However, it will cause an inconvenience in exchanging the seat and stain the vehicle, if the seat needs to be removed or replaced; accordingly, it still not satisfies a requirement of the user in a real application.

SUMMARY OF THE INVENTION

The primary object of present invention is to provide a loose positioning seat which is formed into a perfect driving and a robust positioning by a design which assembles a seat body, a driving positioning set, and a cover, so as to enable a machinery (or other device to be used) to be assembled with the loose positioning seat, such that all kinds of machineries can be quickly and firmly positioned by the loose positioning seat, thereby being provided with effects of easy and quick to assemble, and robust to position, as well as greatly improving a practicability and convenience of the entire seat.

Another object of the present invention is to provide a loose positioning seat which is provided with an effect of easy to carry and use by a design which assembles a seat body, a driving positioning set, and a cover, thereby improving a practicability and convenience of the entire seat.

Accordingly, the present invention includes a seat body, a driving positioning seat, and a cover. The seat body is provided with a block which is partitioned into containing slots at a periphery of the block, and a periphery of the seat body is formed with a plurality of opening slots. The driving positioning set is loosely assembled with a gear on the seat body, and the gear is gnawed with a plurality of positioning members below each of which is provided with a pillar. Each pillar is sheathed with an elastic member and one end of each elastic member is transfixed into the containing slot at the periphery of block, so as to allow each positioning member to be loosely positioned. The cover is assembled on the seat body. Accordingly, the loose positioning seat can be formed into a design of perfect driving and robust positioning, which can be easily and quickly assembled, can be firmly positioned, and can be convenient to carry and use.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
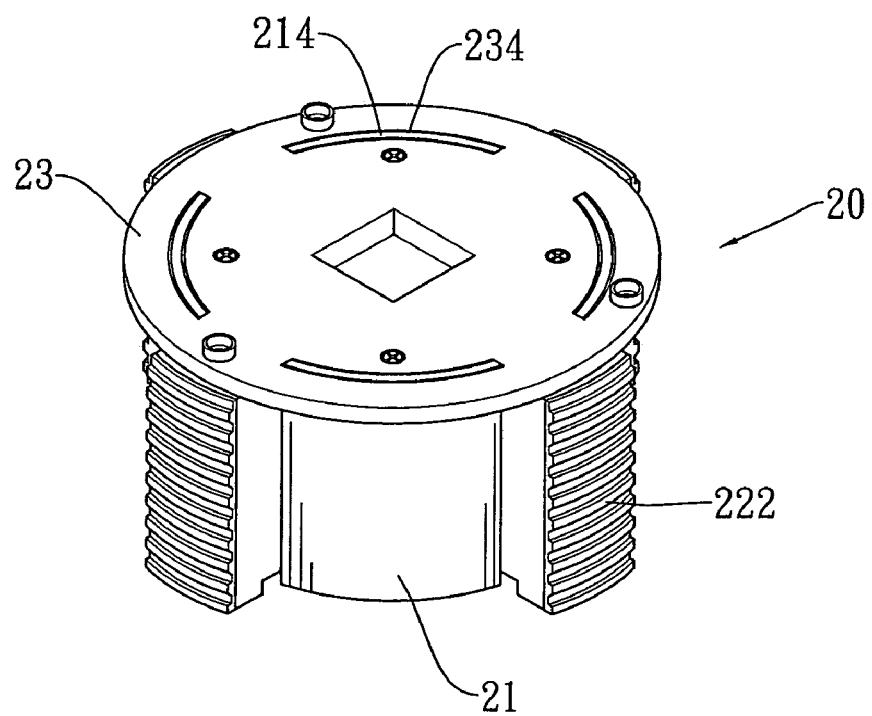
FIG. 1 shows a perspective view of an embodient of the present invention.
Figure 2:
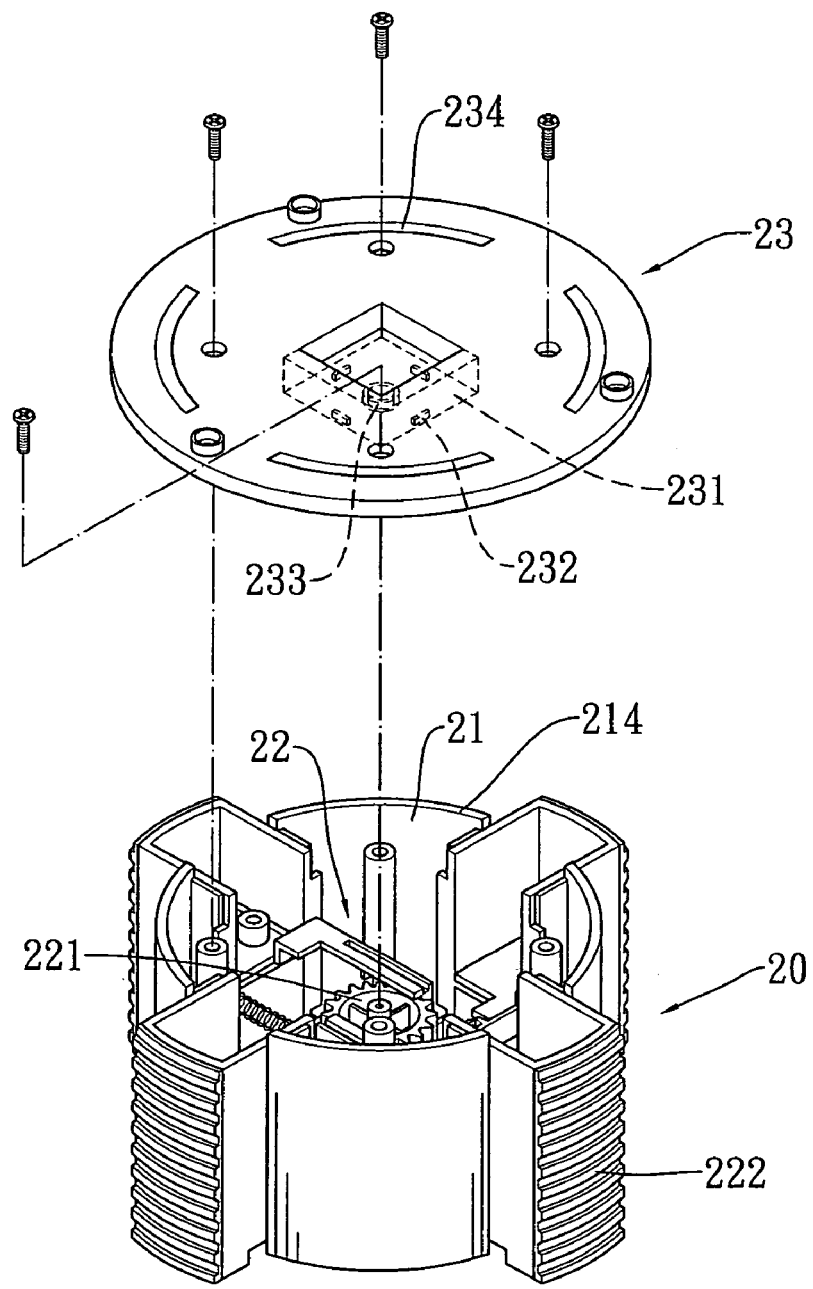
FIG. 2 shows an exploded view of an embodient of the present invention.
Figure 3:
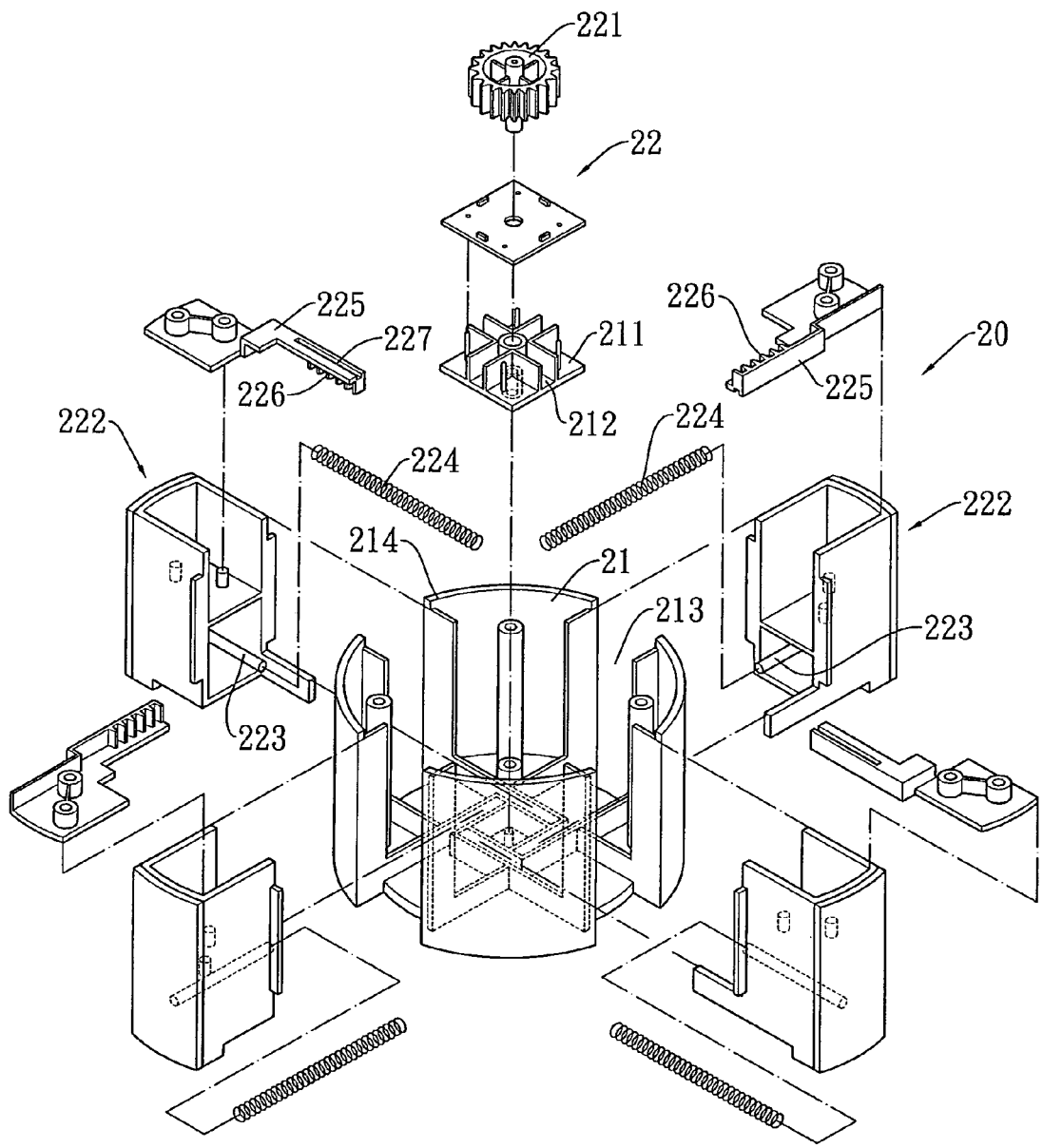
FIG. 3 shows an exploded view of a seat body and a driving positioning set of an embodiment of the present invention.
Figure 4:
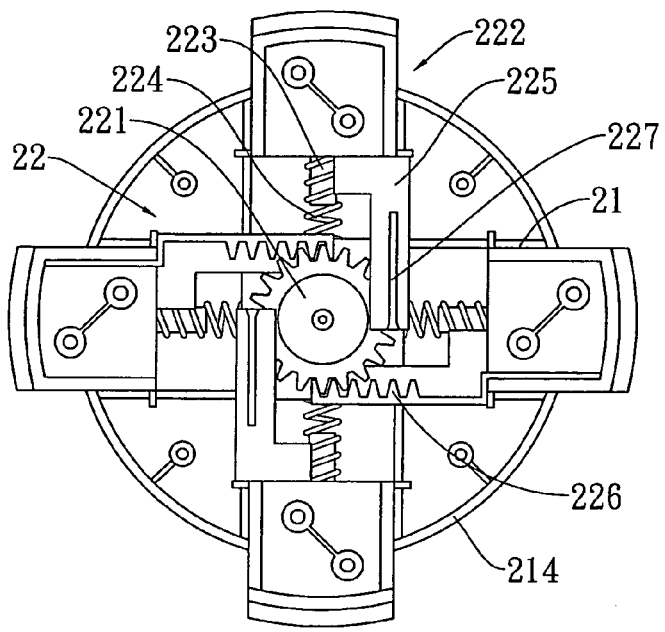
FIG. 4 shows a cutaway view of a loose positioning seat, which is not yet collected, of an embodiment of the present invention.
Figure 5:
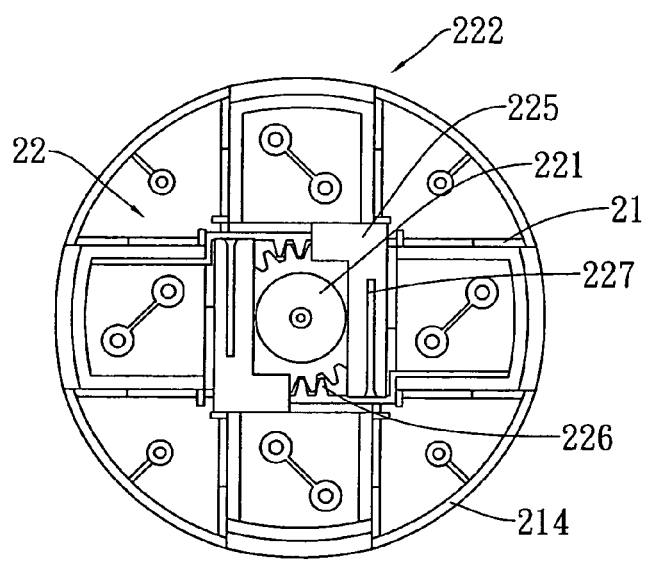
FIG. 5 shows a cutaway view of a loose positioning seat, which is collected, of an embodiment of the present invention.

Referring to FIGS. 1 to 5, a loose positioning seat 20 comprises a seat body 21 which is installed with a block 211 with a periphery of the block 211 being partitioned into containing slots 212 and a periphery of the seat body 21 being formed with a plurality of opening slots 213; a driving positioning set 22 which is loosely assembled with a gear 221 on the seat body 21 with the gear 221 being gnawed with a plurality of positioning members 222 (wherein, an inner side of the positioning member 222 is provided with an extension section 225 on which is installed with a teeth part 226 for allowing the gear 221 to be gnawed with the positioning member 222) below each of which is installed with a pillar 223 on which is sheathed with an elastic member 224, with one end of each elastic member 224 being transfixed into the containing slot 212 at the periphery of block 211 for allowing each positioning member 222 to be loosely positioned; and a cover 23 which is assembled on the seat body 21 with a projection part 231 being located at a bottom of the cover 23, a top of the projection part 231 being provided with a projection piece 232, and the extension section 225 of the positioning member 222 being correspondingly provided with a guiding slot 227 for enabling the positioning member 222 to be loosely positioned and sliding. In addition, a center of the projection part 231 at the bottom of the cover 23 is installed with a sheath part 233, and the cover 23 is provided with a plurality of opening slots 234 which are corresponding to a plurality of ridges 214 installed on the seat body 21, so as to correspondingly sheath the plural opening slots 234 on the cover 23 with each ridge 214 on the seat body 21. On the other hand, the sheath part 233 of cover 23 is sheathed on an axis of the gear 221 on the seat body 21, so as to facilitate the cover 23 to be positioned and assembled with the seat body 21.

Figure 6:
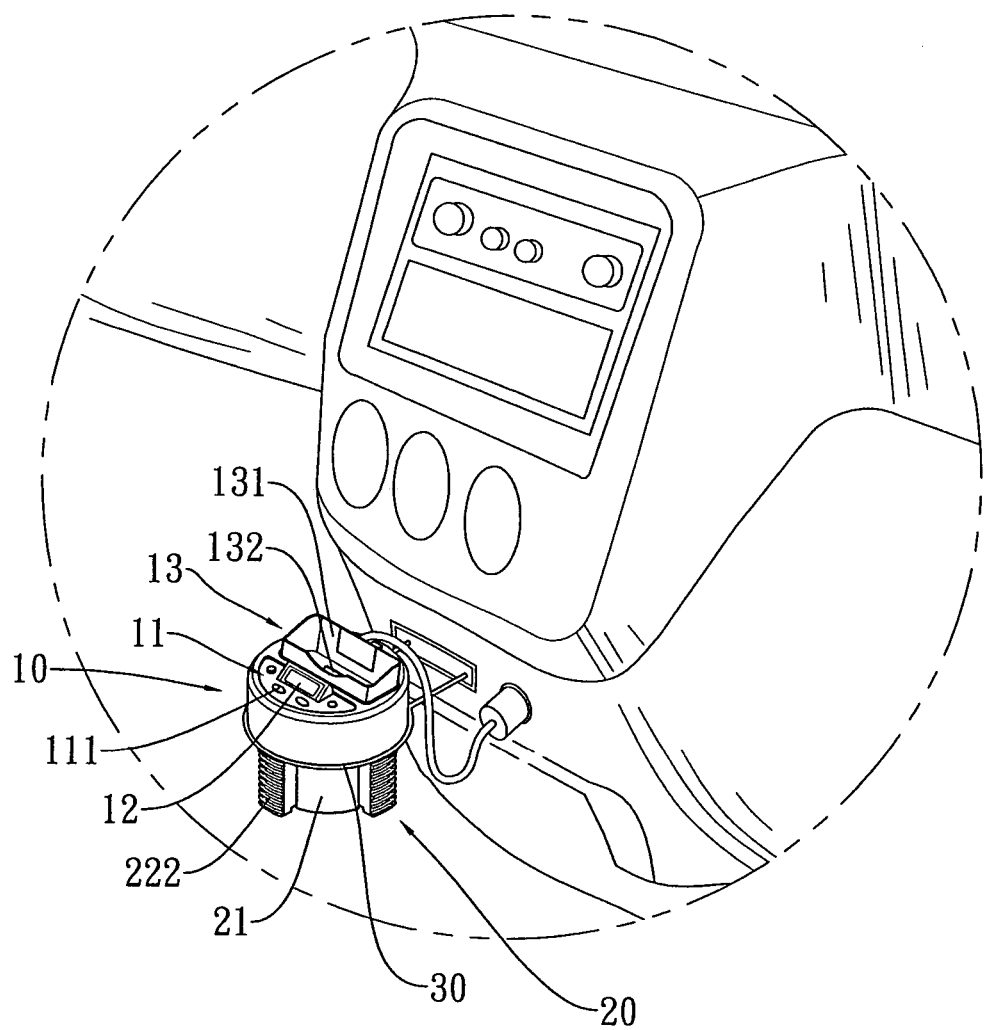
FIG. 6 shows a schematic view of a status of application of an embodiment of the present invention.

Referring to FIGS. 1 to 6, by a design which assembles the seat body 21, the driving positioning set 22, and the cover 23, the loose positioning seat 20 can be formed into the design of perfect driving and robust positioning, thereby assembling a machinery 10 (or other device to be used) with the loose positioning seat 20 to enable the machinery 10 to be quickly and firmly positioned and assembled on all kinds of cup racks 30 in a vehicle by the loose positioning seat 20. Furthermore, by a control unit 11 installed on the machinery 10 and electronically connected with a display unit 12 and a connection unit 13, by a plurality of control keys 111, such as a power on/off key, a channel tuning key, a channel switching key, etc., installed on the control unit 11 for controlling a power on/off of the machinery 10, selecting an FM station to play, and quickly switching the channel, respectively, and by a connection seat 131, a connector 132, a power socket, and an audio socket, which are installed on the connection unit 13, the machinery 10 can be connected to a digital music walkman (iPod) and is provided with a charging function, thereby being provided with the effects of easy and quick to assemble, robust to position, and convenient to carry and use, as well as increasing a practicability and convenience of the entire seat.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A loose positioning seat including a seat body, an interior of which is provided with a block being partitioned into containing slots at a periphery of the block, and a periphery of which is formed with a plurality of opening slots; a driving positioning set which is loosely assembled with a gear on the seat body with the gear being gnawed with a plurality of positioning members below each of which is provided with a pillar being sheathed with an elastic member, and an end of each elastic member being transfixed into the containing slot partitioned at the periphery of block for providing each positioning member to be loosely positioned; and a cover which is assembled on the seat body.

2. The loose positioning seat according to claim 1, wherein an inner side of the positioning member is provided with an extension section on which is installed with a teeth part for enabling the gear to be gnawed with the positioning member.

3. The loose positioning seat according to claim 2, wherein a bottom of the cover is provided with a projection part on which is installed with a projection piece; and the extension section of positioning member being installed with a guiding slot correspondingly, for enabling the positioning member to be loosely positioned and sliding.

4. The loose positioning seat according to claim 3, wherein a center of the projection part at the bottom of cover is installed with a sheath part, the cover is provided with a plurality of opening slots, and the seat body is provided with ridges correspondingly, which enables the plural opening slots on the cover to be sheathed with each ridge correspondingly; and the sheath part of cover being sheathed on an axis of gear on the seat body, so as to facilitate the cover to be positioned and assembled with the seat body.

* * * * *